(12) United States Patent
Chenoux (10) Patent No.: US 11,739,750 B2
(45) Date of Patent: Aug. 29, 2023

(54) GEAR PUMP

(71) Applicant: SAFRAN AERO BOOSTERS SA, Herstal (BE)

(72) Inventor: Mathieu Pierre Chenoux, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 0 days.

(21) Appl. No.: 17/624,741

(22) PCT Filed: Jul. 20, 2020

(86) PCT No.: PCT/EP2020/070456
§ 371 (c)(1),
(2) Date: Jan. 4, 2022

(87) PCT Pub. No.: WO2021/013797
PCT Pub. Date: Jan. 28, 2021

(65) Prior Publication Data
US 2022/0243725 A1    Aug. 4, 2022

(30) Foreign Application Priority Data

Jul. 22, 2019    (BE) .................................. 2019/5478

(51) Int. Cl.
*F03C 2/00*    (2006.01)
*F03C 4/00*    (2006.01)
(Continued)

(52) U.S. Cl.
CPC .......... *F04C 2/101* (2013.01); *F04C 15/0061* (2013.01); *F04C 15/06* (2013.01); *F04C 2240/50* (2013.01)

(58) Field of Classification Search
CPC ...... F04C 2/101; F04C 2/102; F04C 15/0061; F04C 15/06; F04C 2210/206; F04C 2240/50

See application file for complete search history.

(56) References Cited

U.S. PATENT DOCUMENTS 1,496,737 A * 6/1924 Petersen ................. F01C 1/102
418/169
2,399,008 A * 4/1946 Doran ....................... F04C 2/30
418/165

(Continued)

FOREIGN PATENT DOCUMENTS

| EP | 1396639 A1 | 3/2004 | |
| FR | 2574868 A1 * | 6/1986 | .............. F04C 2/101 |
| JP | 2001193667 A | 7/2001 | |

OTHER PUBLICATIONS

FR2574868A1—Voest Alpine AG—Gear Pump with Inner Toothing—Jun. 20, 1986—English Machine Translation (Year: 1986).*

(Continued)

*Primary Examiner* — Theresa Trieu
(74) *Attorney, Agent, or Firm* — Sandberg Phoenix & von Gontard PC (57) ABSTRACT

An internal gear pump comprising: a ring with internal teeth delimiting a cavity and a gear disposed in the cavity, the gear comprising external teeth cooperating with the internal teeth to drive the ring in rotation, remarkable in that it comprises a pinion disposed in the cavity and driving the gear in rotation. The pinion cooperates with the external toothing of the gear. In an alternative embodiment, the gear comprises an internal toothing which cooperates with the pinion.

9 Claims, 7 Drawing Sheets

(51) Int. Cl.
*F04C 18/00* (2006.01)
*F04C 2/00* (2006.01)
*F04C 2/10* (2006.01)
*F04C 15/00* (2006.01)
*F04C 15/06* (2006.01)

(56) References Cited

U.S. PATENT DOCUMENTS

| | | | | | |
|---|---|---|---|---|---|
| 3,115,791 | A | * | 12/1963 | Dean | F16H 3/54 |
| | | | | | 475/263 |
| 3,166,018 | A | * | 1/1965 | Stedman, Jr. | F04C 2/102 |
| | | | | | 418/170 |
| 3,528,345 | A | * | 9/1970 | Rumsey | F04C 2/165 |
| | | | | | 418/196 |
| 5,188,523 | A | * | 2/1993 | Zatrieb | F04C 2/101 |
| | | | | | 418/170 |
| 2017/0211572 | A1 | | 7/2017 | Sangyong et al. | |

OTHER PUBLICATIONS

International Search Report for PCT/EP2020/070456 dated Oct. 28, 2020.
Written Opinion for PCT/EP2020/070456 dated Oct. 28, 2020.

* cited by examiner

Fig. 1

PRIOR ART

GEAR PUMP

The present invention is the US national stage under 35 U.S.C. § 371 of International Application No. PCT/EP2020/070456 which was filed on Jul. 20, 2020, and which claims the priority of application BE2019/5478 filed on Jul. 22, 2019, the content of which (text, drawings and claims) are incorporated here by reference in its entirety.

FIELD

The invention relates to a pump and more particularly to an internal gear pump used to circulate a lubricating fluid in an aircraft jet engine.

BACKGROUND

An internal gear pump typically consists of a ring gear with internal teeth cooperating with a gear wheel arranged inside the ring gear. The gear wheel drives the ring gear in rotation and a fluid flows through the internal space between the gear wheel and the ring gear.

An example of such a pump is disclosed in EP 1 396 639 A1. This document describes more precisely a pump called "gerotor" in which the gear wheel comprises one tooth less than the ring, the latter having openings allowing the passage of fluid radially through the ring.

When it is desired to increase the flow rate of this type of pumps, larger pump dimensions can be used. In both cases, attempting to increase the pump flow rate results in a larger pump footprint, which is not acceptable for the design of aeronautical systems that must remain light, compact and reliable.

The use of an electric motor increases the footprint further because a large torque requires the use of a bulky electric motor. To reduce the necessary torque, it can be useful to provide a gearbox between the electric motor and the pump, but this adds parts to the assembly: the space gained by using a smaller electric motor is lost by the presence of the gearbox between the pump and the motor.

SUMMARY

The purpose of the invention is to provide a gear pump that allows for reduced drive torque, smaller footprint and less complexity.

The object of the invention is an internal gear pump that is in various instances suitable for use in an aircraft engine, the pump comprises an internally toothed ring gear delimiting a cavity and a gear disposed in the cavity, the gear comprises—external toothing cooperating with the internal toothing to drive the ring in rotation, remarkable in that it comprises a pinion disposed in the cavity and driving the gear in rotation.

Through its location in the pump enclosure, the pinion ensures the compactness of the assembly.

According to various advantageous embodiments, the pump can comprise one or more of the following features, considered alone or in any technically possible combination.

In various embodiments the pump comprises a deflector disposed in the cavity, the deflector comprising a first portion tangent to the gear, a second portion tangent to the ring and two connecting portions between the first and second portions, including a concave connecting portion and a convex connecting portion. In other words, the deflector does not have any particular symmetry compared to the "crescent" shapes used in pumps until now. This distinction saves weight and allows some latitude in the choice of pinion's size. The deflector allows the flow to be divided in two.

In various embodiments the pump comprises a flange in which a fluid inlet and a fluid outlet are arranged and possibly housings for receiving bearings supporting the pinion and the gear in rotation. As used herein "flange" means a circular cover which in various instances has dimensions close to those of the ring. The flange is in contact with the ring and axially delimits the cavity. Alternatively, the inlet and outlet orifices can be integrated into the ring as in EP 1 396 639 A1, in particular when the number of teeth is small.

In various embodiments the pinion and possibly the concave connecting portion of the deflector is/are closer to the inlet orifice than to the outlet orifice. Thus, in the vicinity of the outlet (smaller orifice than at the inlet), the flow of the fluid is not disturbed by the rotation or the presence of the pinion. In addition, the efficiency of the pump is lower if the pinion is positioned on the high-pressure side (outlet).

In various embodiments the inlet orifice of the flange hugs the concave connecting portion of the deflector and/or the outlet orifice of the flange is away from the convex connecting portion of the deflector. This limits the risk of cavitation by providing a progressive pressure gradient for the fluid. In various embodiments, a larger inlet orifice than an outlet orifice is advantageous.

In various embodiments the inlet orifice of the flange and the concave connecting portion of the deflector are arranged to direct the flow of fluid towards the gear and towards the ring to ensure a progressiveness in the pressure rise of the fluid. The geometry of the flange and the concave connecting portion result in the fluid not being encouraged to flow towards the pinion when it is sucked into the pump, in order to prevent the rotation of the pinion from disturbing the flow of the fluid.

In various embodiments the deflector is integral with the flange. This simplifies the assembly of the pump by providing a single piece of material. The absence of fastening means improves the weight and compactness of the assembly.

In various embodiments the pinion cooperates with the external toothing of the gear or the gear includes an internal toothing that cooperates with the pinion. These two alternatives offer different possibilities in terms of the arrangement of the pinion in the pump.

In various embodiments the internal teeth of the gear delimit a secondary cavity. The secondary cavity is geometrically a subspace of the cavity bounded by the ring. The secondary cavity can be traversed by the fluid or by another fluid, independently of the (main) cavity.

In various embodiments the flange includes a secondary inlet and a secondary outlet that are fluidly connected to the secondary cavity. Thus, in an advantageous embodiment, the secondary cavity is independent from the main cavity.

In various embodiments the pump comprises an inlet manifold, connected to the inlet orifice and the secondary inlet orifice, and an outlet manifold, connected to the outlet orifice and the secondary outlet orifice, the manifolds being provided with valves allowing the passage of the fluid in either one of the respective orifices or in both respective orifices. By this arrangement, the two cavities can operate simultaneously or independently. There are thus three possible flow rates for the pump for the same rotation speed of the pinion.

As seen in a plane perpendicular to the axis of rotation of the ring, the pinion is at a distance from at least one of the inlet or outlet orifices. It is not desirable for the pinion to interfere with the flow of the fluid and it may therefore be advantageous to keep it at a distance from the inlet and outlet orifices. The gear can overlap the orifices to help draw the fluid flow from the inlet to the outlet.

In various embodiments the reduction ratio between the pinion and the gear is between 2 and 8, and in various instances between 2 and 4, the number of teeth of the pinion being between 4 and 12 and the number of teeth of the gear being between 16 and 30. Any integer value of teeth within these ranges can be selected.

In various embodiments, the invention also relates to a hydraulic system for a turbomachine, in particular for an aircraft turbojet engine, which is remarkable in that it comprises a pump as described above to ensure the circulation of a first fluid.

Advantageously, when the pump comprises a secondary cavity, the system can ensure the circulation of a second fluid, sequentially or simultaneously with the first fluid, the first fluid circulating from the inlet orifice to the outlet orifice and the second fluid circulating from the secondary inlet orifice to the secondary outlet orifice. Thus, the "pinion/gear" pair can function as a gear pump as such, encapsulated within the pump. Alternatively, or additionally, the ring can have external teeth and cooperate with another ring so that these rings also form a gear pump.

In general, the advantageous embodiments of the invention are also applicable to the other embodiments of the invention. Each feature of the invention is combinable with the other features, in all technically possible combinations, unless the contrary is explicitly stated.

By integrating a pinion in the pump housing, it is possible to gain in compactness and weight of the pump assembly, while guaranteeing the torque delivered by the gear for pumping the fluid. In particular, the axial dimension (in relation to the axis of rotation of the ring) can be reduced. There are fewer parts and less weight compared to a pump with a reduction gear outside the pump.

In addition, the reduction gear is naturally in a lubricant bath, whether the fluid being pumped is oil or other, because the heat is removed by the fluid being pumped. Thus, there is self-lubrication of the pinion/gearwheel pair.

DETAILED DESCRIPTION

In the following description, the terms "internal" (or "inside") and "external" (or "outside") refer to a positioning with respect to the axis of rotation of the respective parts (pinion, gear, ring). The axial direction is the direction along the axis of rotation of the ring, which is parallel to the axis of rotation of the pinion or gear. The radial direction is perpendicular to the axis of rotation.

The figures represent the elements schematically, and in particular without the sealing elements of the internal cavity of the pump.

Figure 1:
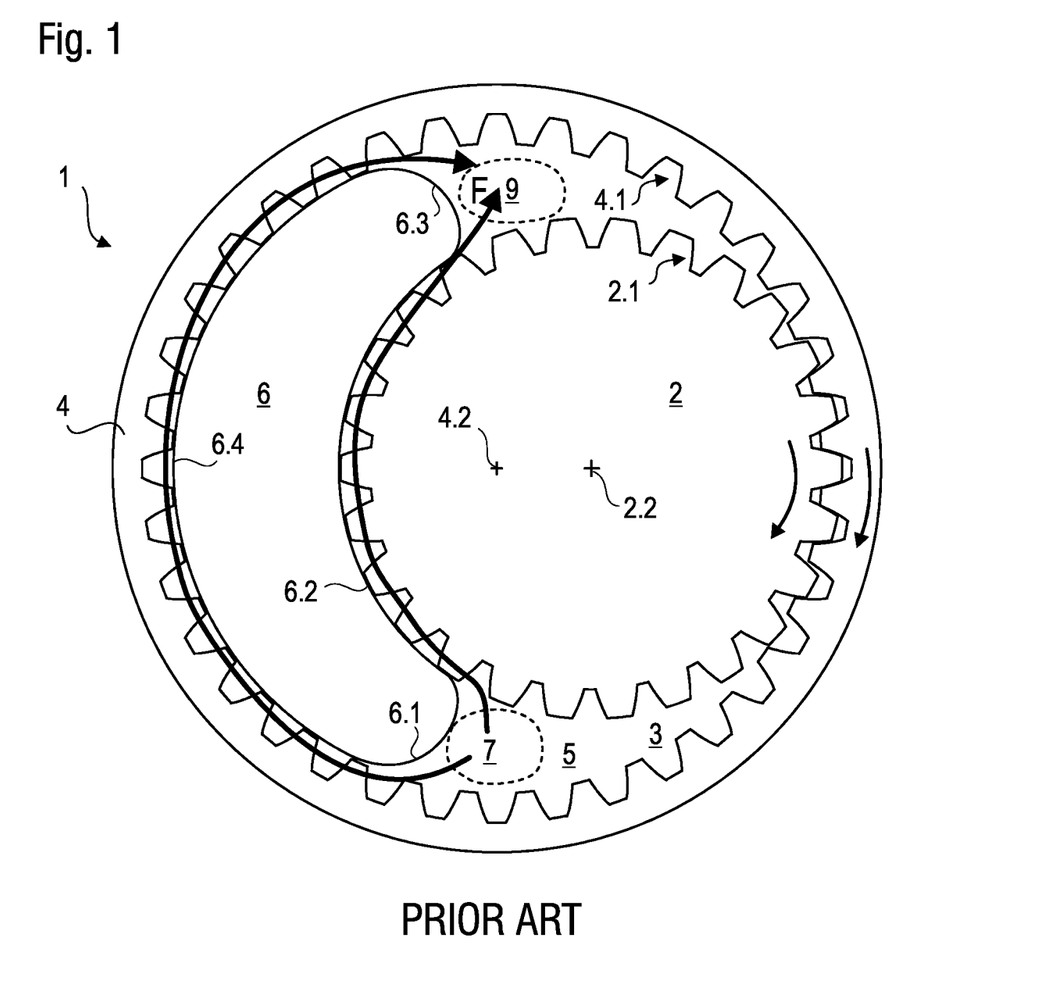
FIG. 1 exemplarily shows a top view of an internal gear pump of the prior art, in accordance with various embodiments of the invention.

FIG. 1 exemplarily shows a top view of a known internal gear pump 1, in which the top cover has been removed. The pump 1 comprises a gear 2, the outer teeth 2.1 of which drive a ring 4 in rotation via the inner teeth 4.1 of the ring. The gear 2 rotates around its axis 2.2 and the ring rotates around its axis 4.2. A cavity 5 between the gear 2 and the ring 4 allows a fluid to flow along a deflector 6 from an inlet orifice 7 to an outlet orifice 9 (see arrows F). The orifices 7, 9 are arranged in a flange 3 (behind the ring 4 in FIG. 1). They are shown as dotted lines in this figure to facilitate reading the drawing although they are visible in this view. When the gear 2 and the ring 4 rotate, a vacuum is created at the inlet orifice 7 and the fluid is sucked into the cavity 5 to be directed along the deflector towards the outlet orifice 9. The deflector is "crescent-shaped", with a portion 6.2 tangent to the gear 2, a portion 6.4 tangent to the ring 4 and two convex portions 6.1, 6.3 connecting the portions 6.2 and 6.4 together. A cover generally covers the pump to axially delimit the cavity 5, together with the flange 3 and the teeth 4.1 of the ring 4.

Figure 2:
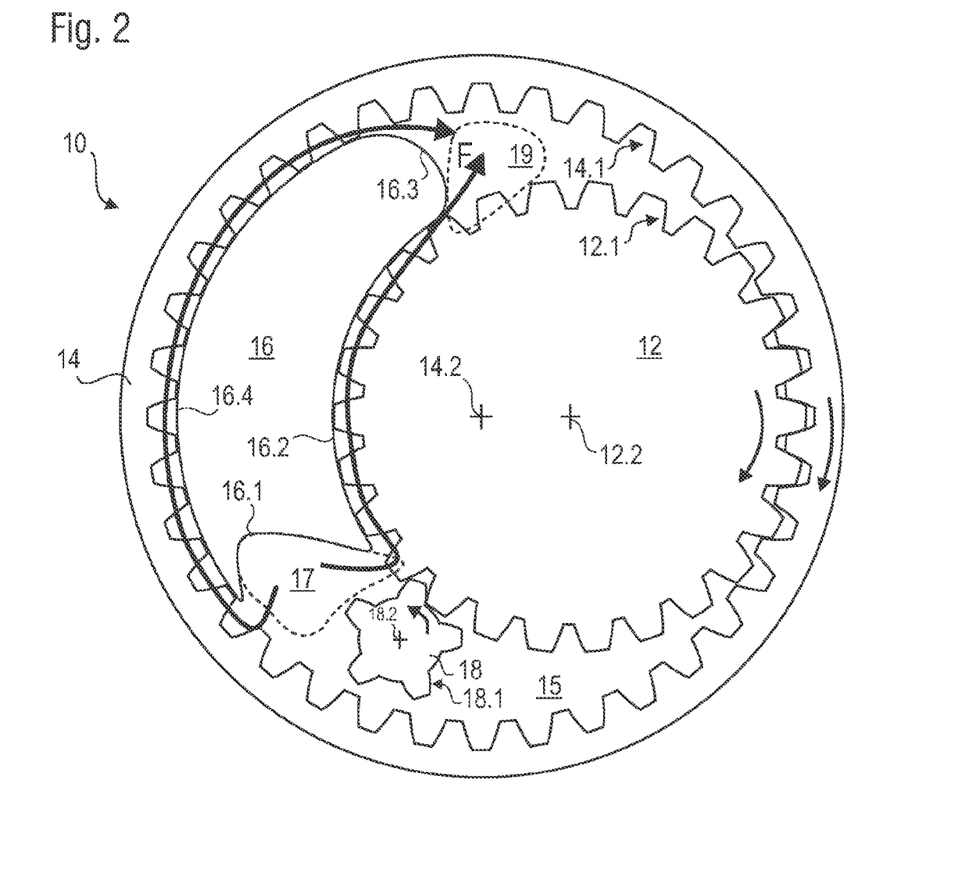
FIG. 2 exemplarily shows a top view of a gear pump according to a first exemplary embodiment.

FIG. 2 exemplarily describes a pump according to a first embodiment of the invention. The elements corresponding to those of the known pump in FIG. 1 are incremented by 10. Thus, the pump 10 comprises a gear 12 driving a ring 14 via their respective toothing 12.1, 14.1. The gear rotates around its axis 12.2 and the ring 14 rotates around its axis 14.2. The internal toothing 14.1 of the ring 14 delimits a cavity 15 in which a fluid can circulate from an inlet orifice 17 (arranged in a flange not shown in FIG. 2) to an outlet orifice 19 along the arrows F. In the cavity 15, a pinion 18 is arranged which rotates around its axis 18.2 and which drives the gear 12 in rotation, by its toothing 18.1 which co-operates with the toothing 12.1. The pinion 18 can be driven by an electric motor not shown and separate from the pump. The pinion 18 is at a distance from the inlet orifice 17 while the gear 12 overlaps the two orifices 17 and 19.

The deflector 16 includes a concave connecting portion 16.1 between a portion 16.2 tangent to the gear 12 and a portion 16.4 tangent to the ring 14. The concave connecting portion 16.1 can be flush to the profile of the inlet orifice 17.

The assembly is arranged so that the rotation of the pinion 18 does not hinder the flow F of the fluid.

In the illustrated example, the pinion 18 has five teeth, the gear 12 has twenty-six teeth and the ring 14 has thirty-six teeth. It is to be understood that the person skilled in the art could vary the number of teeth of each of the elements involved. The teeth 12.1, 14.1, 18.1 are represented as straight teeth but alternatively these can be of a different nature such as helical or chevron teeth.

Figure 3:
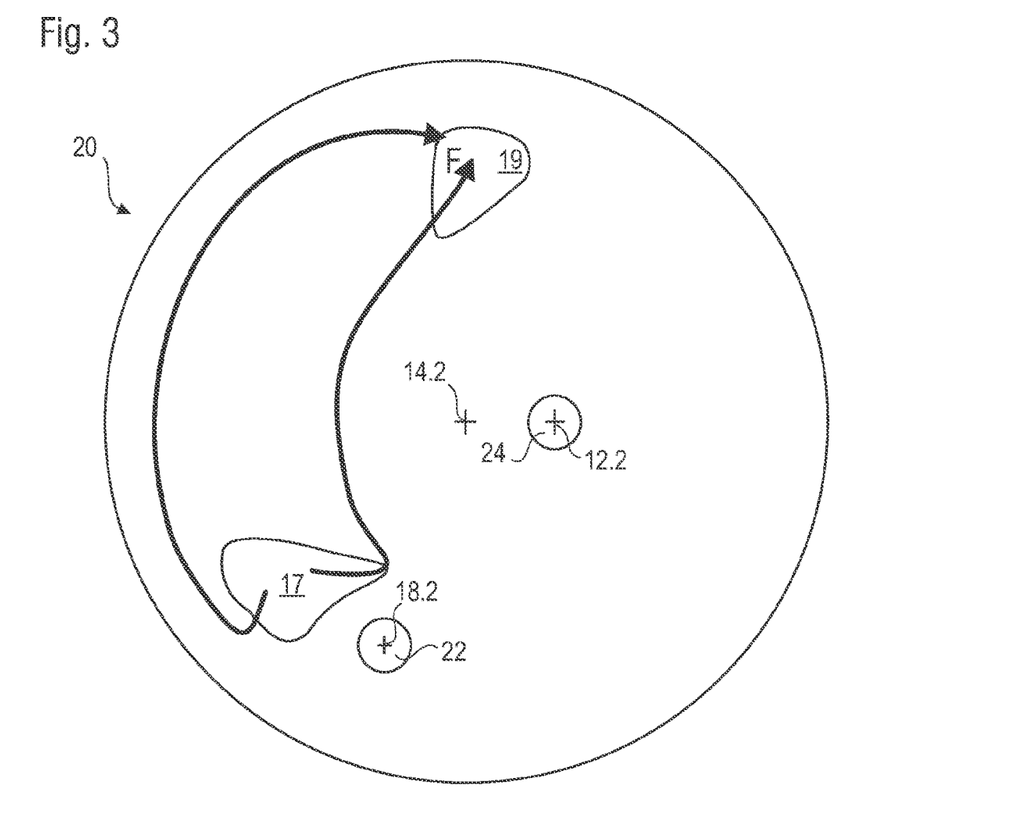
FIG. 3 exemplarily shows the flange alone, in this first embodiment.

The pump can include, behind the assembly of FIG. 2, a flange 20, an example of which is exemplarily shown in FIG. 3. This flange 20 has the general shape of a disk and includes inlet 17 and outlet 19 orifices that open into the cavity (15 in FIG. 2). These orifices are intended to be coupled with inlet and outlet pipes respectively. The flange 20 includes orifices 22, 24 that can accommodate the bearings supporting the pinion 18 and the gear 12 respectively. The deflector (16 in FIG. 2) can be mounted on the flange 20 or these two elements can be integral, i.e., made from one piece.

Figure 4:
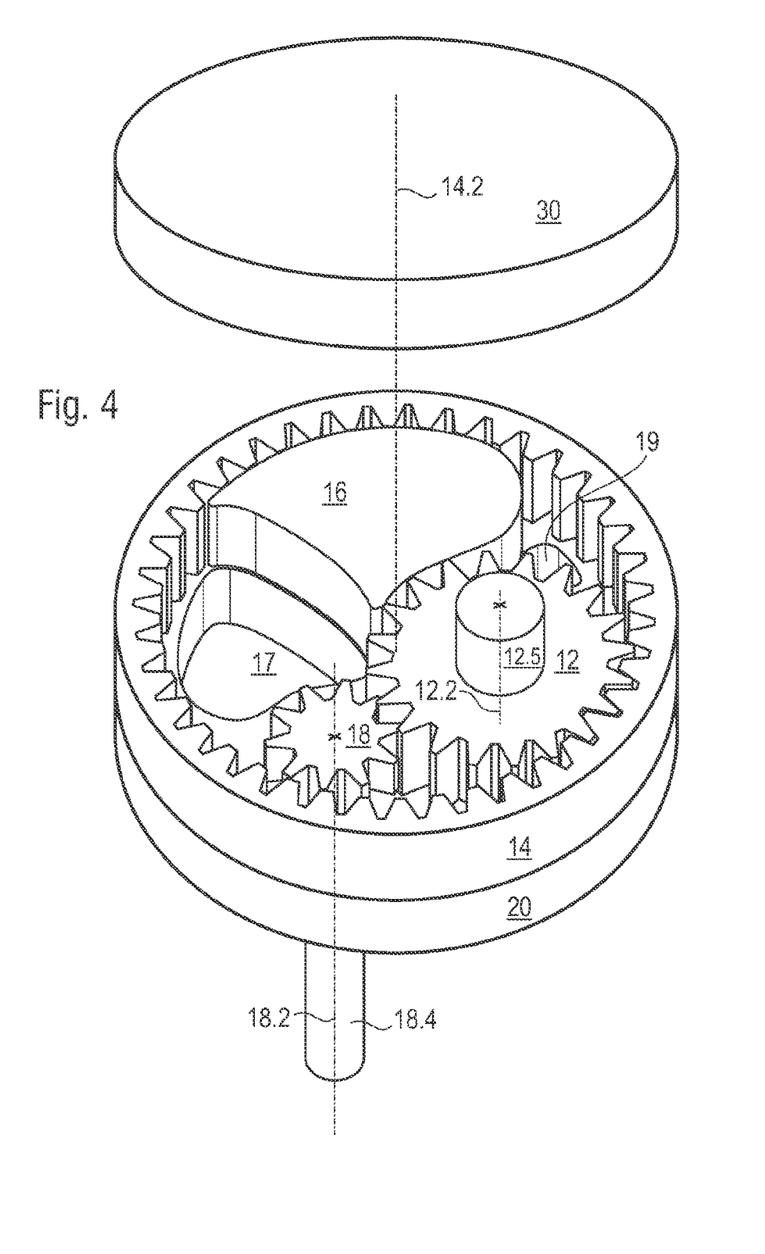
FIG. 4 exemplarily shows an isometric view of the pump in accordance with various embodiments of the invention.

FIG. 4 exemplarily shows an isometric view of the pump 10 according to the first embodiment. In FIG. 4, a different reduction ratio is illustrated than in FIG. 3, both between the pinion 18 and the gear 12 and between the gear 12 and the ring 14. This illustrates different variations of the design of the pump according to various embodiments of the invention.

FIG. 4 exemplarily shows the flange 20 supporting the ring 14, the gear 12 and the pinion 18. Opposite the flange 20 with respect to the ring 14 is a cover 30 (in exploded view) intended to close the cavity 15 opposite the flange 20. The cover 30 can have a shape substantially similar to the flange 20. In an embodiment that is not shown, one and/or the other of the holes 17, 19 can optionally be located on the cover 30 rather than on the flange 20. The flange 20 and/or cover 30 can be diametrically larger than the ring 14 and have a cylindrical shoulder contacting the outer diameter of the ring 14. Other design options can have an external housing, eccentric or counterbore in the flange.

A shaft 18.4 is shown below the flange 20 to embody, for example, the output shaft of an electric motor that is rotationally fixed to the pinion 18.

A journal 12.5 is shown above the gear 12. It can be received in a housing of the cover 30 provided for this purpose.

Figure 5:
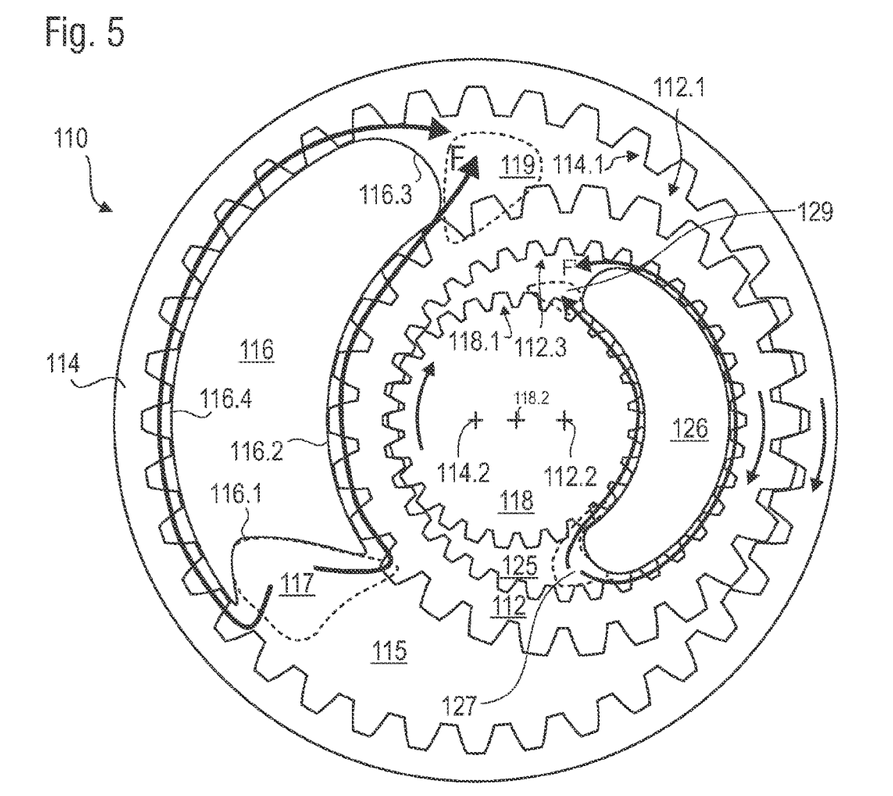
FIG. 5 shows a top view of a gear pump according to a second embodiment.

FIG. 5 exemplarily shows a pump 110 according to a second embodiment of the invention. The elements corresponding to the elements of the pump 10 of the first embodiment have reference numbers incremented by 100.

Thus, the pump includes a ring 114 having internal teeth 114.1 and rotating around its axis 114.2. A deflector 116 is arranged in the cavity 115 delimited by the internal teeth 114.1 of the ring 114. The ring 114 is driven in rotation by the gear 112 via its external teeth 112.1.

The deflector 116 can be—as shown—substantially similar to the deflector 16 of the preceding figures, or can be crescent-shaped like the deflectors of the pumps of the state of the art (see FIG. 1).

A pinion 118 having external teeth 118.1 and rotating on its axis 118.2 is arranged in the cavity 115. More particularly, the pinion 118 is arranged in a secondary cavity 125 delimited by an internal toothing 112.3 of the gear 112 and the toothing 118.1 of the pinion 118 meshes with the internal toothing 112.3 of the gear.

In an advantageous embodiment, a secondary deflector 126 can be disposed in the secondary cavity 125. A secondary inlet 127 and a secondary outlet 129 can be arranged in the flange (120 see FIG. 6) to create a secondary fluid pumping flow indicated by the arrows F'. Thus, the pinion 118 and gear 112 function like a conventional gear pump, except that it is encapsulated another gear pump. Thus, there are two "nested" pumps that can be independently driven (see FIG. 7).

In the example shown in FIG. 5, the pinion 118 is "on the left-hand side" of the gear 112 and the shaft 118.2 is adjacent to the shaft 114.2. The dimensions (diameters and teeth of the elements involved) can easily be calculated so that the axis 118.2 coincides exactly with the axis 114.2. This centering of the masses can reduce vibrations. Alternatively, the position of the pinion 118 can be different and the pinion 118 can be to the right of the crescent 126.

In the first embodiment, the choice of design of the gear teeth 18.1 of pinion 18 is constrained by the teeth of ring 14 and gear 12. This is not the case in this second embodiment, as the teeth 112.1 and 112.3 are independent and can be different. This facilitates the design and can potentially avoid vibrations.

It should be noted that although FIG. 5 depicts a secondary cavity and a secondary pump, the invention can also be directed to an embodiment without this secondary pump, i.e., where the pinion 118/gear 112 pair is a simple gear.

Figure 6:
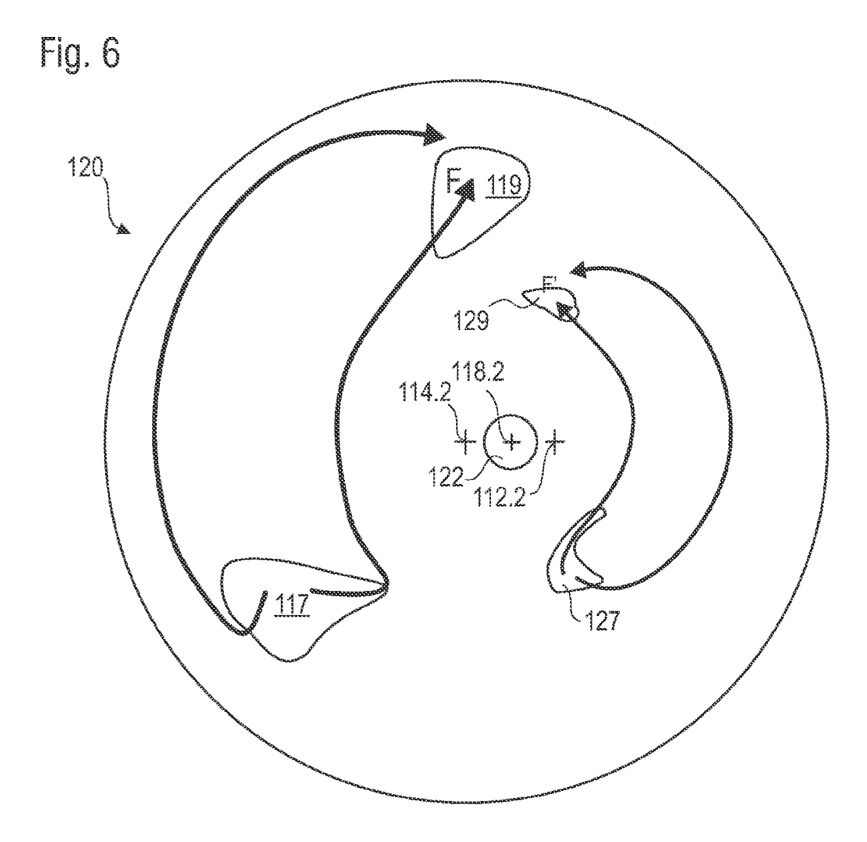
FIG. 6 depicts the flange alone, in this second embodiment.

FIG. 6 exemplarily shows the flange 120 of the second embodiment. This is identical to the flange 20 of FIG. 3 with the difference that it accommodates the two secondary orifices 127, 129 and that only the housing 122 of the pinion 118 is shown, the housing of the gearwheel bearing 112 being located in the cover 130.

Figure 7:
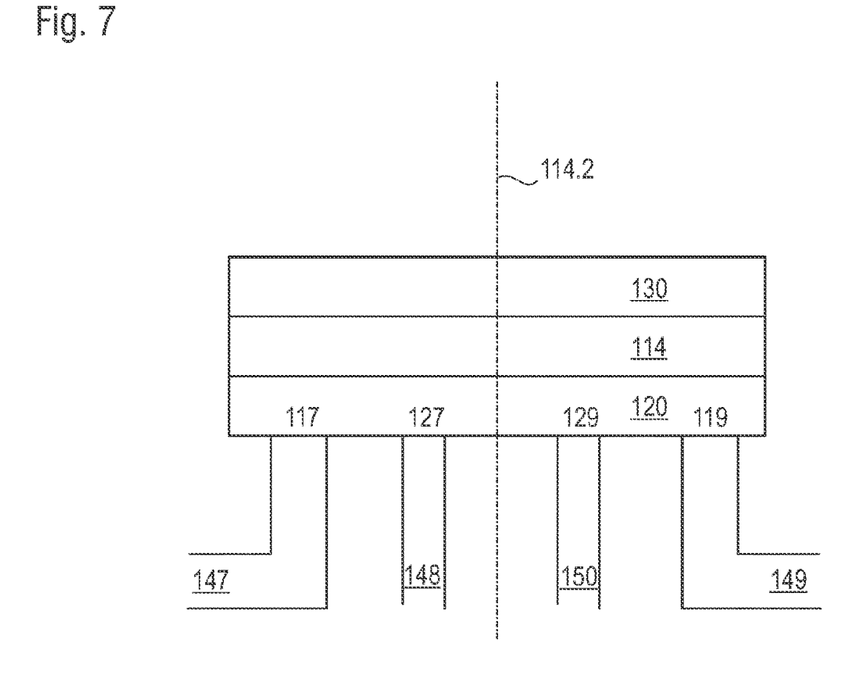
FIG. 7 shows a front view of the pump according to the second embodiment.
Figure 8:
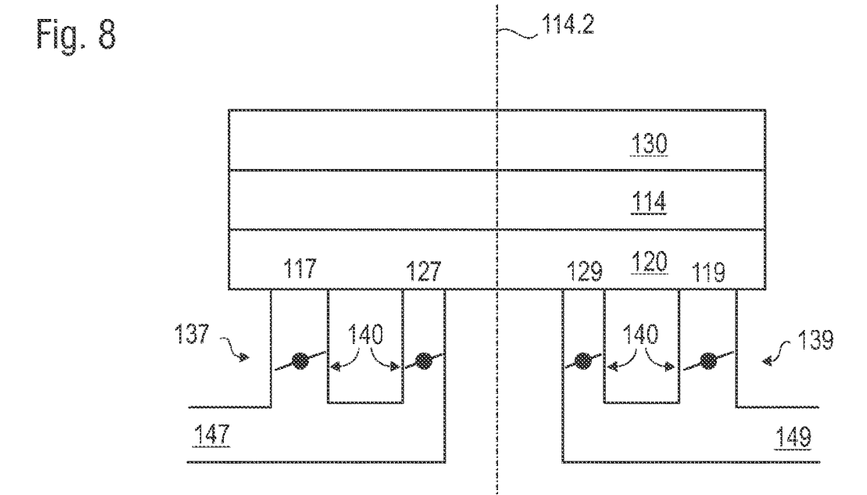
FIG. 8 shows a front view of the pump according to the second embodiment provided with inlet and outlet manifolds.

FIGS. 7 and 8 exemplarily schematically illustrate two possible uses of the pump according to the second embodiment. These figures are front views in a direction perpendicular to the axis 114.2.

One can see the cover 130 which encloses the cavity delimited by the ring 114 and the flange 120. The orifices 117, 119, 127, 129 of the flange 120 are connected to conduits 147, 148, 149, 150.

In FIG. 7, the pipes 147, 148, 149, 150 are independent from each other and can be connected to two different hydraulic circuits circulating two possibly different fluids.

In FIG. 8, an inlet manifold 137 and an outlet manifold 139 are provided to connect the inlet orifices 117, 127 and the outlet orifices 119, 129 to each other. A respective line 147, 149 connects the manifolds 137, 139 to the rest of the hydraulic system (not shown).

Illustrated in FIG. 8, but also arrangeable in the lines of FIG. 7, valves 140 can allow for more versatile control of pumping.

For example, with reference to FIG. 8, the valves 140 can respectively assume an open or closed state, resulting in four states, including a no-flow fluid state where all valves are closed. For the same rotation of the pinion 118, it is therefore possible to obtain three different fluid flows: a first flow if the valves of the lines 127 and 129 are open and the valves of the lines 117 and 119 are closed; a second flow, greater than the first flow if the valves of the lines 117 and 119 are open and the valves of the lines 127 and 129 are closed; and finally, a third flow greater than the second flow if all the valves are open.

If the valves 140 take intermediate positions between the open and closed position, other flow values can also be obtained.

What is claimed is:

1. A pump for an aircraft engine, the pump comprising:
   a ring with internal teeth delimiting a cavity;
   a gear disposed in the cavity, the gear comprising external teeth cooperating with the internal teeth, so as to drive the ring in rotation;
   a pinion disposed in the cavity and driving the gear in rotation; and
   a deflector disposed in the cavity, the deflector comprising a first portion that is tangent to the gear, a second portion that is tangent to the ring and two connecting portions between the first portion and the second portion, the two connecting portions consisting in a concave connecting portion and a convex connecting portion.

2. The pump according to claim 1, further comprising a flange, the flange comprising a fluid inlet orifice and a fluid outlet orifice.

3. The pump according to claim 2, wherein the pinion is closer to the inlet orifice than to the outlet orifice.

4. The pump according to claim 2, further comprising wherein the fluid inlet orifice of the flange conforms to the concave connecting portion of the deflector.

5. The pump according to claim 2, further comprising wherein the fluid outlet orifice of the flange diverges from the convex connecting portion of the deflector.

6. The pump according to claim 2, further comprising a deflector disposed in the wherein the deflector is integral with the flange.

7. The pump according to claim 2, wherein when viewed in a plane perpendicular to the axis of rotation of the ring, the pinion is at a distance from the inlet orifice and from the outlet orifice.

8. The pump according to claim 1, wherein the pinion cooperates with the external toothing of the gear.

9. The pump according to claim 1, wherein a reduction ratio between the pinion and the gear is between 2 and 8, a number of teeth of the pinion being between 4 and 12 and a number of teeth of the gear being between 16 and 30.

* * * * *